United States Patent
Wilhelm et al.

(10) Patent No.: US 8,528,319 B2
(45) Date of Patent: Sep. 10, 2013

(54) APPARATUS, SYSTEM, AND METHOD FOR MITIGATING DIESEL EXHAUST FLUID DEPOSITS AND ASSOCIATED CONDITIONS

(75) Inventors: Daniel D. Wilhelm, Columbus, IN (US); Kwadwo O. Owusu, Columbus, IN (US); April Evans, Columbus, IN (US); Xiao Lin, Columbus, IN (US); Robert Kern, Columbus, IN (US); Douglas Alan Mitchell, Columbus, IN (US); Lisa Farrell, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 442 days.

(21) Appl. No.: 12/975,064

(22) Filed: Dec. 21, 2010

(65) Prior Publication Data

US 2011/0146240 A1    Jun. 23, 2011

Related U.S. Application Data

(60) Provisional application No. 61/288,661, filed on Dec. 21, 2009.

(51) Int. Cl.
*F01N 11/00* (2006.01)

(52) U.S. Cl.
USPC ........... 60/277; 60/274; 60/285; 60/286; 60/291; 60/295; 60/297; 60/300; 60/301; 60/311; 60/320

(58) Field of Classification Search
USPC ........... 60/274, 277, 285, 286, 287, 291, 60/295, 297, 300, 301, 311, 320
See application file for complete search history.

(56) References Cited

U.S. PATENT DOCUMENTS

| | | | |
|---|---|---|---|
| 5,941,918 A | 8/1999 | Blosser | |
| 6,003,307 A | 12/1999 | Naber et al. | |
| 7,073,320 B2 | 7/2006 | Moritsugu et al. | |
| 2008/0271440 A1 | 11/2008 | Xu et al. | |
| 2009/0025368 A1 * | 1/2009 | Sakimoto et al. | 60/285 |
| 2010/0122525 A1 * | 5/2010 | Fujita et al. | 60/285 |
| 2011/0030343 A1 * | 2/2011 | Kiser et al. | 60/274 |

FOREIGN PATENT DOCUMENTS

WO 2008068226 A1 6/2008

OTHER PUBLICATIONS

PCT/US2010/061619 International Search Report and Written Opinion, Aug. 10, 2011.

* cited by examiner

*Primary Examiner* — Thomas Denion
*Assistant Examiner* — Jorge Leon, Jr.
(74) *Attorney, Agent, or Firm* — Kunzler Law Group, PC

(57) ABSTRACT

According to one embodiment, described herein is an apparatus for mitigating on-board diagnostic (OBD) faults generated by an OBD system of an internal combustion engine (ICE) system having a selective catalytic reduction system with a diesel exhaust fluid (DEF) decomposition tube. The apparatus includes a fault mitigation module that is configured to monitor at least one OBD signal of the OBD system and issue a request for regenerating the DEF decomposition tube when a value of the at least one OBD signal reaches a predetermined regeneration threshold corresponding with the at least one OBD signal. The regeneration threshold is reachable prior to an OBD fault threshold corresponding with the at least one OBD signal. The apparatus also includes a regeneration module that is configured to regenerate the DEF decomposition tube according to the issued request.

20 Claims, 4 Drawing Sheets

APPARATUS, SYSTEM, AND METHOD FOR MITIGATING DIESEL EXHAUST FLUID DEPOSITS AND ASSOCIATED CONDITIONS

CROSS-REFERENCE TO RELATED APPLICATION

This application claims the benefit of U.S. Provisional Patent Application No. 61/288,661, filed Dec. 21, 2009, which is incorporated herein by reference.

FIELD

The subject matter of the present disclosure relates to internal combustion engine systems with an exhaust aftertreatment system, and more particularly to reducing the deleterious effects on internal combustion engine systems stemming from reductant deposits on components of an associated exhaust aftertreatment system.

BACKGROUND

Exhaust aftertreatment systems receive and treat exhaust gas generated by an internal combustion engine. Typical exhaust aftertreatment systems include any of various components configured to reduce the level of harmful exhaust emissions present in the exhaust gas. For example, some exhaust aftertreatment systems for diesel powered internal combustion engines include various components, such as a diesel oxidation catalyst (DOC), particulate matter filter or diesel particulate filter (DPF), and a selective catalytic reduction (SCR) catalyst. In some exhaust aftertreatment systems, exhaust gas first passes through the diesel oxidation catalyst, then passes through the diesel particulate filter, and subsequently passes through the SCR catalyst.

Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst reduces the amount of nitrogen oxides ($NO_x$) present in the exhaust gas.

The SCR catalyst is configured to reduce $NO_x$ into less harmful emissions, such as $N_2$ and $H_2O$, in the presence of ammonia ($NH_3$). Because ammonia is not a natural byproduct of the combustion process, it must be artificially introduced into the exhaust gas prior to the exhaust gas entering the SCR catalyst. Typically, ammonia is not directly injected into the exhaust gas due to safety considerations associated with the storage of gaseous ammonia. Accordingly, conventional systems are designed to inject a diesel exhaust fluid (DEF) or reductant into the exhaust gas, which is capable of decomposing into gaseous ammonia in the presence of exhaust gas under certain conditions. The DEF commonly used by conventional exhaust aftertreatment systems is a urea-water solution.

Generally, the decomposition of DEF into gaseous ammonia occupies three stages. First, DEF mixes with exhaust gas and water is removed from the DEF through a vaporization process. Second, the temperature of the exhaust causes a thermolysis-induced phase change in the DEF and decomposition of the DEF into isocyanic acid (HNCO) and $NH_3$. Third, the isocyanic acid reacts with water in a hydrolysis process under specific pressure and temperature concentrations to decompose into ammonia and carbon dioxide ($CO_2$).

The gaseous ammonia is then introduced at the inlet face of the SCR catalyst, flows through the catalyst, and is consumed in the $NO_x$ reduction process. Any unconsumed ammonia exiting the SCR system can be reduced to $N_2$ and other less harmful or less noxious components using an ammonia oxidation catalyst.

SCR systems typically include a DEF source and a DEF injector or doser coupled to the source and positioned upstream of the SCR catalyst. The DEF injector injects DEF into a decomposition space or tube through which an exhaust gas stream flows. Upon injection into the exhaust gas stream, the injected DEF spray is heated by the exhaust gas stream to trigger the decomposition of DEF into ammonia. As the DEF and exhaust gas mixture flows through the decomposition tube, the DEF further mixes with the exhaust gas before entering the SCR catalyst. Ideally, DEF is sufficiently decomposed and mixed with the exhaust gas prior to entering the SCR catalyst to provide an adequately uniform distribution of ammonia at the inlet face of the SCR catalyst.

Some prior art exhaust aftertreatment systems, however, do not provide adequate decomposition and mixing of injected DEF. Often, conventional systems cause exhaust gas recirculation within the DEF decomposition tube or low temperature regions within the decomposition tube. Exhaust gas recirculation and low temperature regions may result in inadequate mixing or decomposition, which may lead to the formation of solid DEF deposits on the inner walls of the decomposition tube and DEF injector. Solid DEF deposits include the solid byproducts from incomplete decomposition of urea, such as biuret, cyanuric acid, ammelide, and ammeline. Additionally, inadequate mixing may result in a low ammonia vapor uniformity index, which can lead to uneven distribution of the ammonia across the SCR catalyst surface, lower $NO_x$ conversion efficiency, and other shortcomings.

The formation of solid DEF deposits and uneven ammonia distribution may also be caused by DEF spray being deflected away from an intended target. Following injection, the DEF spray typically rapidly decelerates due to entrainment of exhaust gas into the spray. Rapid deceleration reduces DEF spray penetration and momentum, which makes the injected DEF spray susceptible to substantial redirection when contacted by exhaust flow gases. Undesirable redirection of DEF spray may result in DEF spray unintentionally contacting certain surfaces of the decomposition tube (e.g., an inner wall of the decomposition tube and an upper portion of a mixer) and forming solid DEF deposits thereon. The formation of solid DEF deposits within the decomposition tube typically results in a lower amount of ammonia concentration and a lower ammonia distribution uniformity index at the inlet face of the SCR catalyst, which can degrade the performance and control of the SCR catalyst. Additionally, solid DEF deposits in the decomposition tube can induce exhaust backpressure within the exhaust aftertreatment system, which can adversely impact the performance of the engine and exhaust aftertreatment system.

Solid DEF deposits within the decomposition tube can also indirectly trigger diagnostic faults associated with diagnostic signals that may be influenced by DEF deposits. For example, DEF deposits may cause a low $NO_x$ conversion rate, which may result in false decisions made by a $NO_x$ conversion efficiency monitor of an on-board diagnostics (OBD) system. Further, in exhaust aftertreatment systems employing a DPF, DEF deposits may act to increase the exhaust pressure at the outlet of the DPF, which may trigger a DPF outlet high pressure diagnostic fault. In this situation, the DPF outlet high pressure diagnostic fault is false because the DPF outlet high pressure condition is not a result of the condition of the DPF, but rather DEF deposit buildup downstream of the DPF.

Some conventional systems recognize the negative effect of DEF deposit buildup on the SCR catalyst. Such systems employ regeneration techniques to regenerate the SCR catalyst and remove the DEF deposits from the SCR catalyst. These systems, however, do not account for DEF deposit build-up within the DEF decomposition tube upstream of the SCR catalyst and the effect such DEF deposit build-ups can have on the OBD system.

SUMMARY

The subject matter of the present application has been developed in response to the present state of the art, and in particular, in response to the problems and needs in the art that have not yet been fully solved by currently available exhaust aftertreatment systems employing an SCR system. Accordingly, the subject matter of the present application has been developed to provide various embodiments of an apparatus, a system, and a method for mitigating adverse conditions induced by DEF deposit formation that overcomes at least some of the above or other shortcomings of the prior art.

Generally, a desirable apparatus, system, or method would mitigate the impact DEF deposits have on the engine and exhaust aftertreatment system before the DEF deposits reach a size that may cause undesirable and/or irreversible consequences. The apparatus, system, and method accomplishes this goal by ensuring that diagnostic fault conditions not directly related to DEF deposits are effectively detected by an OBD monitor and a desirable $NO_x$ reduction capability/efficiency is maintained. As defined herein, DEF deposits within a DEF decomposition tube are solid DEF deposits that form on the inner surface of the DEF decomposition tube, the DEF injector, the surface of a DEF injector recess, or any other component within or attached to the DEF decomposition tube.

Described herein are various embodiments of an apparatus, a system, and a method for mitigating adverse conditions induced by DEF deposit formation. Generally, the system includes an OBD system and an exhaust aftertreatment system with an SCR system. The OBD system monitors the diagnostics of the exhaust aftertreatment system and sets diagnostic faults when associated diagnostic signals reach a fault threshold. The SCR system is configured to inject DEF into a decomposition tube prior to entering an SCR catalyst. A controller of the system requests a regeneration event within the decomposition tube to decompose DEF deposits in the tube in response to one or more associated diagnostic signals reaching a regeneration threshold before reaching the fault threshold. If the diagnostic signals were being negatively influenced by DEF deposits in the decomposition tube, then proper decomposition of the DEF deposits during the regeneration event will reduce the likelihood of the diagnostic signals reaching the fault threshold. Reducing unnecessary diagnostic faults related to DEF deposits improves engine and aftertreatment system performance and reduces costs associated with the maintenance of engine and aftertreatment system components. Also, the proper decomposition of DEF deposits during the regeneration event may improve the $NO_x$ reduction capability of the SCR system.

According to one embodiment, described herein is an apparatus for mitigating on-board diagnostic (OBD) faults generated by an OBD system of an internal combustion engine (ICE) system having a selective catalytic reduction system with a diesel exhaust fluid (DEF) decomposition tube. The apparatus includes a fault mitigation module that is configured to monitor at least one OBD signal of the OBD system and issue a request for regenerating the DEF decomposition tube when a value of the at least one OBD signal reaches a predetermined regeneration threshold corresponding with the at least one OBD signal. The regeneration threshold is reachable prior to an OBD fault threshold corresponding with the at least one OBD signal. The apparatus also includes a regeneration module that is configured to regenerate the DEF decomposition tube according to the issued request.

In some implementations, the apparatus further includes a system override module that is configured to alert a user of user actions preventing the initiation of a requested regeneration event and implement measures for mitigating consequences of the user actions if the user does not cease the user actions within a predetermined time period. The apparatus can also include a diagnostic interrupt module that is configured to suspend monitoring of the at least one OBD signal in response to the issuance of a request for regenerating the DEF decomposition tube. The measures for mitigating consequences of the user actions can include overriding the suspension of the monitoring of the at least one OBD signal to re-enable the monitoring of the at least one OBD signal. In another implementation, the measures for mitigating consequences of the user actions comprise torque derating of the ICE system. The predetermined time period can be based on an estimate of the deposition rate of DEF deposits within the DEF decomposition tube.

According to certain implementations, the apparatus further includes a regeneration frequency module that is configured to monitor the period of time between a previous exhaust aftertreatment system regeneration event and the request for regenerating the DEF decomposition tube. The regeneration frequency module delays an initiation of the requested regeneration of the DEF decomposition tube if the period of time is less than a time threshold.

In yet some implementations, the apparatus further includes a diagnostic interrupt module that is configured to suspend monitoring of the at least one OBD signal in response to the issuance of a request for regenerating the DEF decomposition tube. The diagnostic interrupt module can be configured to resume monitoring of the at least one OBD signal after regeneration of the DEF decomposition tube is complete.

According to some implementations, the apparatus also includes a system override module that is configured to limit a normal injection rate of DEF into the DEF decomposition tube during active DEF decomposition tube regeneration. The system override module limits the normal injection rate of DEF by a determined amount based on a maximum DEF injection rate for DEF decomposition, a minimum DEF injection rate for cooling a DEF injector tip, a DEF injection rate corresponding to a minimum desired ammonia-to-$NO_x$ ratio at an inlet of a selective catalytic reduction catalyst of the selective catalytic reduction system, and the normal injection rate of DEF. The limited injection rate of DEF can be the lesser of: (1) the greater of the maximum DEF injection rate for DEF decomposition, the minimum DEF injection rate for cooling a DEF injector tip, and the DEF injection rate corresponding to the minimum desired ammonia-to-NOx ratio; and (2) the normal injection rate of DEF.

In certain implementations, the at least one OBD signal is at least one of a first OBD signal corresponding with a $NO_x$ conversion efficiency of the selective catalytic reduction system and a second OBD signal corresponding with a particulate matter filter outlet high pressure.

According to another embodiment, described herein is a system for mitigating on-board diagnostic (OBD) faults generated by an OBD system of an internal combustion engine (ICE) system and caused by solid diesel exhaust fluid (DEF) deposits. The system includes a selective catalytic reduction (SCR) system comprising a DEF injector and DEF decomposition tube where the DEF injector configured to inject DEF into the DEF decomposition tube. The system also includes a controller that includes a diagnostic fault module configured to monitor a plurality of OBD signals of the OBD system and set a diagnostic fault when a monitored OBD signal reaches a fault threshold corresponding with the monitored OBD signal. The controller also includes a fault mitigation module that is configured to monitor at least one OBD signal of the plurality of OBD signals that is susceptible to solid DEF deposits within the decomposition tube. The fault mitigation module is configured to request regeneration of the DEF decomposition tube when the at least one monitored OBD signal susceptible to solid DEF deposits within the decomposition tube reaches a corresponding regeneration threshold. The regeneration threshold is set to be reached before the fault threshold corresponding with the at least one monitored susceptible OBD signal. The at least one susceptible OBD signal can be a $NO_x$ conversion efficiency OBD signal and/or a particulate matter filter outlet high pressure OBD signal that is based at least partially on input from a particulate matter filter outlet exhaust pressure sensor.

In some implementations of the system, the controller includes an override module that is configured to limit the rate at which DEF is injected into the DEF decomposition tube by the DEF injector during an active regeneration of the DEF decomposition tube. The system may also include an oxidation catalyst upstream of the SCR system. The DEF decomposition tube is positioned between an SCR catalyst of the SCR system and the oxidation catalyst. Control of the regeneration of the DEF decomposition tube can be based on an oxidation catalyst outlet temperature.

In another embodiment, described herein is a method for mitigating on-board diagnostic (OBD) faults in an internal combustion engine (ICE) system having a selective catalytic reduction system with a diesel exhaust fluid (DEF) decomposition tube. The method includes monitoring a plurality of OBD signals and setting a diagnostic fault when one of the plurality of OBD signals reaches a corresponding fault threshold. Further, the method includes monitoring at least one OBD signal of the plurality of OBD signals that is susceptible to solid DEF deposits within the decomposition tube. The method also includes requesting regeneration of the DEF decomposition tube when the at least one OBD signal susceptible to solid DEF deposits within the decomposition tube reaches a corresponding regeneration threshold. The regeneration threshold is reachable before the fault threshold corresponding with the at least one susceptible OBD signal. The method additionally includes regenerating the DEF decomposition tube according to the regeneration request and suspending monitoring of the at least one susceptible OBD signal during regeneration of the DEF decomposition tube.

According to one implementation, the at least one susceptible OBD signal is a $NO_x$ conversion efficiency OBD signal associated with the selective catalytic reduction system. In such an implementation, the regeneration threshold of the $NO_x$ conversion efficiency OBD signal is higher than the fault threshold of the $NO_x$ conversion efficiency OBD signal.

In yet one implementation, the at least one susceptible OBD signal is a particulate matter filter outlet high pressure OBD signal. In such an implementation, the regeneration threshold of the particulate matter filter outlet high pressure OBD signal is lower than the fault threshold of the particulate matter filter outlet high pressure OBD signal.

Reference throughout this specification to features, advantages, or similar language does not imply that all of the features and advantages that may be realized with the subject matter of the present disclosure should be or are in any single embodiment or implementation of the subject matter. Rather, language referring to the features and advantages is understood to mean that a specific feature, advantage, or characteristic described in connection with an embodiment is included in at least one embodiment. Discussion of the features and advantages, and similar language, throughout this specification may, but do not necessarily, refer to the same embodiment or implementation.

The described features, advantages, and characteristics of the subject matter of the present disclosure may be combined in any suitable manner in one or more embodiments and/or implementations. One skilled in the relevant art will recognize that the subject matter of the present disclosure may be practiced without one or more of the specific features or advantages of a particular embodiment or implementation. In other instances, additional features and advantages may be recognized in certain embodiments and/or implementations that may not be present in all embodiments or implementations of the subject matter of the present disclosure. These features and advantages of the present subject matter will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

The described features, structures, or characteristics of the subject matter of the present disclosure may be combined in any suitable manner in one or more embodiments. In the following description, numerous specific details are provided to impart a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the subject matter.

Figure 1:
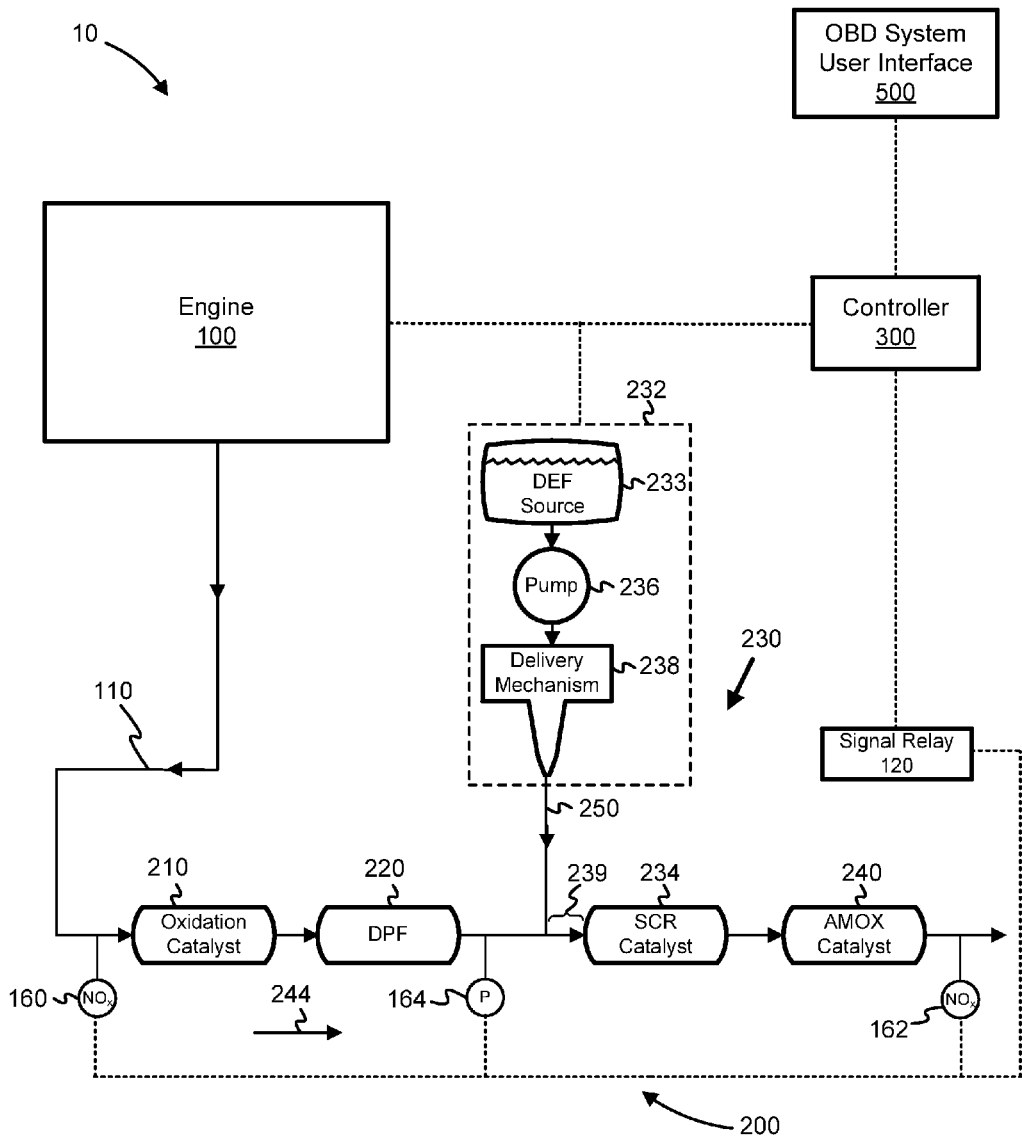
FIG. 1 is a schematic diagram of an engine system according to one embodiment of the invention.

As shown in FIG. 1, one embodiment of an internal combustion engine system 10 includes an internal combustion engine 100, an exhaust aftertreatment system 200 coupled to the exhaust output 110 of the engine, a controller 300, and an OBD system user interface 500. The internal combustion engine 100 can be a compression ignited internal combustion engine, such as a diesel fueled engine, or a spark-ignited internal combustion engine, such as a gasoline fueled engine operated lean. Although not shown, the engine 100 can include any of various sensors, such as temperature sensors, pressure sensors, and mass flow sensors.

The exhaust gas aftertreatment system 200 is coupled to an outlet pipe of an exhaust manifold. Exhaust gas passing through the outlet pipe is represented by exhaust output 110. At least a portion of the exhaust output 110 passes through the exhaust aftertreatment system 200. Generally, the exhaust aftertreatment system 200 is configured to remove various chemical compound and particulate emissions present in the exhaust output 110 received from the outlet pipe. After being treated by the exhaust aftertreatment system 200, the exhaust gas is expelled into the atmosphere via a tailpipe (not shown). In certain implementations, the exhaust aftertreatment system 200 is secured to a vehicle in which the engine is housed.

In the illustrated embodiment, the exhaust aftertreatment system 200 includes an oxidation catalyst 210, a particulate matter filter or diesel particulate filter (DPF) 220, an SCR system 230 having a DEF delivery system 232 and an SCR catalyst 234, and an ammonia oxidation (AMOX) catalyst 240. In an exhaust flow direction, indicated by directional arrow 244, the exhaust output 110 flows through the oxidation catalyst 210, through the DPF 220, through the SCR catalyst 234, through the AMOX catalyst 240, and is then expelled into the atmosphere via the tailpipe. In other words, the DPF 220 is positioned downstream of the oxidation catalyst 210, the SCR catalyst 234 is positioned downstream of the DPF 220, and the AMOX catalyst 240 is positioned downstream of the SCR catalyst 234. The oxidation catalyst 210, DPF 220, SCR catalyst 234, and AMOX catalyst 240 can be coupled together by an exhaust tube or pipe. Generally, exhaust gas treated in the exhaust aftertreatment system 200 and released into the atmosphere consequently contains significantly fewer pollutants, such as diesel particulate matter, $NO_x$, hydrocarbons, such as carbon monoxide and carbon dioxide, than untreated exhaust gas.

The oxidation catalyst 210 can be any of various flow-through, diesel oxidation catalysts (DOC) known in the art. Generally, the oxidation catalyst 210 is configured to oxidize at least some particulate matter, e.g., the soluble organic fraction of soot, in the exhaust and reduce unburned hydrocarbons and CO in the exhaust to less environmentally harmful compounds. For example, the oxidation catalyst 210 may sufficiently reduce the hydrocarbon and CO concentrations in the exhaust to meet the requisite emissions standards.

The DPF 220 can be any of various particulate filters known in the art configured to reduce particulate matter concentrations, e.g., soot and ash, in the exhaust gas to meet requisite emission standards. The DPF 220 can be electrically coupled to a controller, such as controller 300, that controls various characteristics of the DPF, such as, for example, the timing and duration of filter regeneration events.

The SCR system 230 includes a DEF delivery system 232 that includes a DEF source 233, pump 236, and DEF delivery mechanism 238 (e.g., an injector). The DEF source 233 can be a container or tank capable of retaining DEF, such as, for example, ammonia ($NH_3$) or urea. The DEF source 233 is in DEF supplying communication with the pump 236, which is configured to pump DEF from the DEF source to the DEF delivery mechanism 238. The DEF delivery mechanism 238 is coupled to the exhaust tube at a location upstream of the SCR catalyst 234 and downstream of the DPF 220. The SCR system 230 further includes a DEF decomposition tube or pipe 239 (e.g., a decomposition reactor pipe (DRP)) defined as the portion of the exhaust tube downstream of the DEF delivery mechanism 238 and upstream of the SCR catalyst 234. The delivery mechanism 238 includes an injector that is selectively controllable to inject DEF 250 directly into the exhaust gas stream through an injector introduction opening or tube in the DEF decomposition tube 239. Although not shown, the SCR system 230 can include a mixer plate installed within the DEF decomposition tube 239 upstream of the SCR catalyst 234 and downstream of the DEF injector and injector introduction opening.

In some embodiments, the DEF is urea, which decomposes as it travels through the DEF decomposition tube 239 to produce ammonia as discussed above. The ammonia reacts with $NO_x$ in the presence of the SCR catalyst 234 to reduce the $NO_x$ to less harmful emissions, such as $N_2$ and $H_2O$. The capability of the SCR catalyst 234 to reduce $NO_x$ to less harmful emissions is largely dependent upon the capability of the DEF to decompose to ammonia. As discussed above, in some instances, all of the injected DEF may not completely decompose to ammonia due to localized exhaust gas recirculation within the DEF decomposition tube 239, low temperature regions of exhaust gas within the DEF decomposition tube, poor mixing of DEF and exhaust gas within the DEF decomposition tube, or unfavorable injected DEF droplet sizes. Sometimes, some injected DEF may contact the inner walls of the DEF decomposition tube 239, mixer plate within the decomposition tube, the DEF injector introduction tube, or the DEF injector itself. Incomplete decomposition of DEF into ammonia and DEF sprayed onto the walls of the DEF decomposition tube 239 may lead to the formation of solid DEF deposits on the inner walls of the DEF decomposition tube 239, and in some cases the DEF injector 238, DEF injector introduction tube, and mixer plate. Solid DEF deposits can negatively affect the performance of the engine and aftertreatment systems 10, 200 as described above.

The SCR catalyst 234 can be any of various catalysts known in the art. For example, in some implementations, the SCR catalyst 234 is a vanadium-based catalyst, and in other implementations, the SCR catalyst is a zeolite-based catalyst, such as a Cu-Zeolite or a Fe-Zeolite catalyst. In one representative embodiment, the DEF is aqueous urea solution and the SCR catalyst 234 is a zeolite-based catalyst.

The AMOX catalyst 240 can be any of various flow-through catalysts configured to react with ammonia to produce mainly nitrogen. Generally, the AMOX catalyst 240 is utilized to remove ammonia that has slipped through or exited the SCR catalyst 234 without reacting with $NO_x$ in the exhaust. In certain instances, the aftertreatment system 200 can be operable with or without an AMOX catalyst. Further, although the AMOX catalyst 240 is shown as a separate unit from the SCR catalyst 234, in some implementations, the AMOX catalyst can be integrated with the SCR catalyst, e.g., the AMOX catalyst and the SCR catalyst can be located within the same housing.

Although the exhaust aftertreatment system 200 of FIG. 1 shows one DOC 210, one DPF 220, one SCR catalyst 234, and one AMOX catalyst 240 in a specific order relative to each other, in other embodiments, an exhaust aftertreatment system can have fewer or more than the number of exhaust treatment devices shown in FIG. 1 in a different order relative to each other without departing from the essence of the invention.

The exhaust aftertreatment system 200 can include any of various sensors, such as temperature sensors, pressure sensors, oxygen sensors, $NO_x$ sensors, $NH_3$ sensors, dual $NH_3/NO_x$ sensors, and the like. Although in the engine system 10 of FIG. 1, only SCR inlet $NO_x$ sensor 160, SCR outlet $NO_x$ sensor 162, and DPF outlet pressure sensor 164 are shown, the system can include any of various other sensors as desired. Generally, the sensors can be disposed throughout the exhaust aftertreatment system 200 and configured to detect various operating conditions necessary for operation of the engine and exhaust aftertreatment systems 10, 200. More specifically, the sensors of the engine system 10 are configured to detect an operating condition value and generate a response signal representative of the detected operating condition value. For example, the sensors of the engine system 10 can be configured to detect respective operating condition values associated with exhaust gas flowing from the engine 100 through the exhaust aftertreatment system 200. The sensors can be designed to detect or sample a respective operating condition value periodically. For each detection period, a sensor transmits a response representative of the detected operating condition value to the controller 300. The controller interprets the response received from the sensor using predetermined look-up tables or algorithms to determine a numerical amount of the detected operating condition.

In certain implementations, the engine system 10 includes a signal relay 120 in signal receiving communication with one or more of the sensors of the system 10. The signal relay 120 transmits the received signals to the controller 300 for computation and analysis. In certain implementations, the engine system 10 does not include a signal relay 120, and each of the various sensors of the engine system is in electrical communication directly with the controller 300.

Some engine system diagnostics are more susceptible (e.g., more sensitive) to the formation of DEF deposits in the DEF decomposition tube 239, in the DEF injector introduction tube, and on the DEF injector than other diagnostics. Accordingly, diagnostic decision faults based on such susceptible diagnostics are likewise more susceptible to being set, whether falsely or correctly, as a consequence of DEF deposit formation. The susceptible diagnostics preferably should run frequently. Diagnostics that run less frequently, or are periodically disabled, may not be desirable in some implementations as significant time can elapse between suspected DEF deposit observations, during which large DEF deposits may occur.

Generally, engine system diagnostics are based largely on system conditions as sensed by engine system sensors. The engine system includes diagnostics logic (e.g., diagnostic fault module 310) that processes the various sensor signals upon which a diagnostic is based and produces a diagnostic signal. The produced diagnostic signal is compared to a preset threshold to determine if a diagnostic decision fault should be set for the particular diagnostic. An exhaust aftertreatment system diagnostic may be susceptible to DEF deposits when one or more of the sensed parameters used in the diagnostic is affected by the DEF deposits.

In one implementation, a susceptible diagnostic is the SCR $NO_x$ conversion efficiency diagnostic. The system sets a diagnostic fault when the determined $NO_x$ conversion efficiency of the SCR system 230 drops below a threshold. The $NO_x$ conversion efficiency is based largely on the difference between the $NO_x$ concentration signals from the SCR inlet and outlet $NO_x$ sensors 160, 162. Generally, as the $NO_x$ concentration detected by the SCR outlet $NO_x$ sensor increases without a corresponding increase in the SCR inlet $NO_x$ sensor 160, the $NO_x$ conversion efficiency of the SCR system is dropping. Typically, the SCR outlet $NO_x$ sensor 162 detects a relatively higher $NO_x$ concentration when DEF deposits are present within the DEF decomposition tube 239 and injection tube than when DEF deposits are not present. In other words, when DEF deposits are present, a higher percentage of $NO_x$ can be passing through the SCR catalyst 234. Therefore, DEF deposits in the DEF decomposition tube 239 and DEF injector introduction tube may reduce the $NO_x$ conversion efficiency of the SCR system 230, thereby making the $NO_x$ conversion efficiency diagnostic a susceptible diagnostic.

Another susceptible diagnostic is the DPF outlet high pressure diagnostic, which is based on the DPF outlet pressure sensor signal and other sensor signals (e.g., exhaust mass flow rate sensor signal, exhaust gas temperature sensor signal, etc.). The system sets a diagnostic fault when the DPF outlet high pressure diagnostic signal rises above a threshold. Generally, the DPF outlet high pressure diagnostic signal represents the amount of time a determined DPF outlet pressure is above a pressure threshold. If the amount of time the determined DPF outlet pressure exceeds a time threshold, then a diagnostic fault is set. DEF deposit formation within the DEF decomposition tube 239 may result in an increased backpressure of the SCR system 230, which can result in the DPF outlet sensor 164 detecting a higher pressure. In most systems, the bigger the DEF deposit formation, the higher the backpressure. Therefore, DEF deposits in the DEF decomposition tube 239 may increase the DPF outlet pressure, thereby making the DPF outlet high pressure diagnostic a susceptible diagnostic.

Based on the foregoing, the SCR $NO_x$ conversion efficiency diagnostic and setting of the associated fault, as well as the DPF outlet high pressure diagnostic and setting of the associated fault, may be more susceptible to DEF deposit formation than other diagnostics and the setting of their corresponding faults. The SCR $NO_x$ conversion efficiency diagnostic and DPF outlet high pressure diagnostic, and their associated faults, are shown and described as being particularly susceptible to DEF deposits by way of example only. In other implementations, other diagnostics and their associated faults may be susceptible to DEF deposits. For example, in some embodiments, an engine system can include SCR outlet $NO_x$ sensor in-range diagnostics and SCR outlet $NO_x$ sensor gain rationality diagnostics that may be susceptible to DEF deposits. The principles and features described herein may be equally applicable to these and other diagnostics and faults susceptible to DEF deposits as they are to the SCR $NO_x$ conversion efficiency diagnostic and DPF outlet high pressure diagnostic, and their associated faults.

The controller 300 in FIG. 1 is depicted as a single physical unit, but can include two or more physically separated units or components in some embodiments if desired. Generally, the controller 300 receives multiple inputs, processes the inputs, and transmits multiple outputs. The multiple inputs may include sensed measurements from sensors and various user inputs. The inputs are processed by the controller 300 using various algorithms, stored data, and other inputs to update the stored data and/or generate output values. The generated output values and/or commands are transmitted to other components of the controller and/or to one or more elements of the engine system 10 to control the system to achieve desired results.

Figure 2:
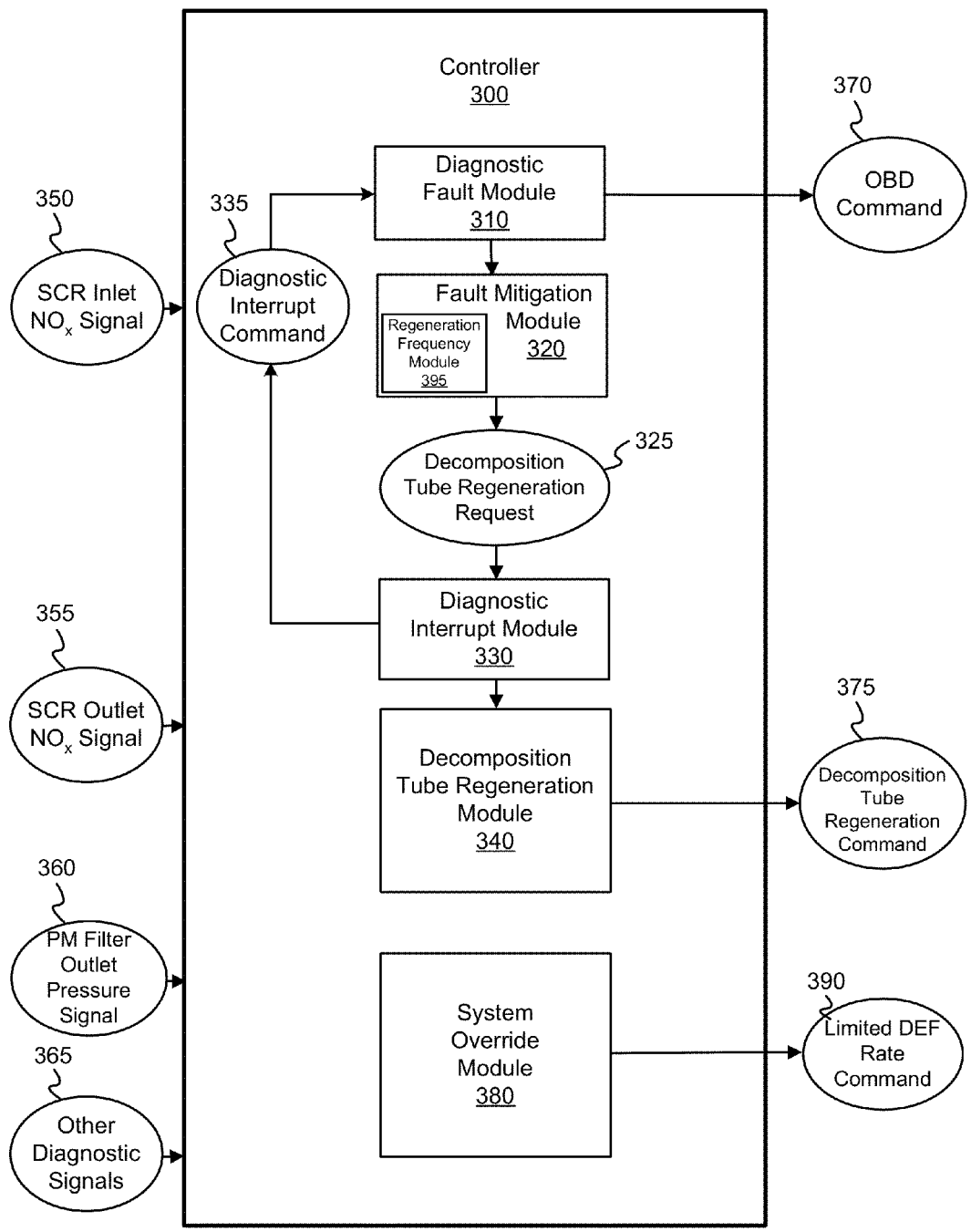
FIG. 2 is a block diagram of a controller of the engine system of FIG. 1 according to one embodiment of the invention.

More specifically, as shown in the illustrated embodiment of FIG. 2, the controller 300 includes a diagnostic fault module 310, fault mitigation module 320, diagnostic interrupt module 330, and decomposition tube regeneration module 340. The controller 300 also receives an SCR inlet $NO_x$ signal 350 from the $NO_x$ sensor 160, an SCR outlet $NO_x$ signal 355 from the $NO_x$ sensor 162, a DPF outlet pressure signal 360 from the pressure sensor 164, and other diagnostic signals from any of various other sensors. The controller 300 is configured to issue OBD commands 370 to the OBD system user interface 500 when a diagnostic fault is set. In certain implementations, the OBD system user interface 500 includes an MIL, or other indication, that is illuminated, or otherwise activated, in response to the receipt of an OBD command 370. Additionally, the controller 300 is configured to issue a decomposition tube regeneration command 375 when operating conditions warrant regeneration of the DEF decomposition tube 239.

The diagnostic fault module 310 monitors the diagnostics of the engine system 10 and issues OBD commands 370 when the signals associated with the monitored diagnostics reach or exceed respective predetermined fault thresholds (e.g., when diagnostic faults are set). In certain embodiments, the diagnostic fault module 310 is part of a vehicle's OBD system. The monitored diagnostics of the engine can be any of various operating conditions, operating parameters, or component conditions. Often, although not necessarily, the monitored diagnostics are associated with one or more conditions detected by sensors or determined by computer modules. Often, the predetermined thresholds correspond with a diagnostic signal value above or below which the performance of the engine system 10 and/or exhaust aftertreatment system 200 falls below a desired level.

For example, as described above, one predetermined fault threshold corresponds with an SCR $NO_x$ conversion efficiency diagnostic. The diagnostic signal corresponding with the SCR $NO_x$ conversion efficiency diagnostic falling below the associated fault threshold corresponds with a deficiency in the emissions reduction performance of the engine and exhaust aftertreatment systems 10, 200. The $NO_x$ conversion efficiency of the SCR system 230 is based at least partially on the $NO_x$ concentration levels corresponding with the SCR inlet $NO_x$ signal 350 and the SCR outlet $NO_x$ signal 355. The diagnostic fault module 310 is configured to compute the $NO_x$ conversion efficiency of the SCR system 230, set a diagnostic fault, and issue a $NO_x$ conversion efficiency OBD command to the user interface 500 if the computed NO conversion efficiency reaches or falls below the associated $NO_x$ conversion efficiency fault threshold. In response to the issued $NO_x$ conversion efficiency OBD command 370, the OBD system user interface 500 alerts a user (e.g., a driver of a vehicle) via a malfunction indicator light (MIL), or the like, that the $NO_x$ conversion efficiency of the system, more specifically the SCR system 230, has fallen below a desirable level.

Also as described above, another predetermined fault threshold may correspond with a DPF outlet high pressure diagnostic. The diagnostic signal of the DPF outlet high pressure diagnostic rising above the associated fault threshold may correspond with an undesirably high SCR system backpressure. As mentioned above, the DPF outlet high pressure diagnostic signal corresponds with the amount of time a determined DPF outlet pressure is above a pressure threshold. Accordingly, the diagnostic fault module 310 is configured to compute the DPF outlet high pressure diagnostic signal, which is partially based on the DPF outlet pressure signal 360 from the sensor 164, and monitor the DPF outlet high pressure diagnostic signal (e.g., monitor the time during which the DPF outlet pressure is above a pressure threshold). The diagnostic fault module 310 is further configured to set a diagnostic fault and issue a corresponding OBD command 370 to the user interface 500 if the monitored DPF outlet high pressure diagnostic signal reaches or exceeds the associated DPF outlet high pressure diagnostic fault threshold. In response to the issued OBD command 370, the OBD system user interface 500 alerts a user that the backpressure of the SCR system 230 has reached an undesirable level.

The diagnostic fault module 310 can monitor diagnostics of the engine and exhaust aftertreatment systems 10, 200 and issue OBD commands 370 for diagnostics other than those associated with $NO_x$ conversion efficiency and DPF outlet high pressure. For example, based on other diagnostic signals 365, OBD commands 370 can be issued when temperature sensor signals detect an exhaust gas temperature above or below a predetermined temperature fault threshold, when a level of DEF in the source 233 falls below a corresponding predetermined fault threshold, and when $NH_3$ sensors detect a concentration of $NH_3$ in exhaust downstream or upstream of the AMOX catalyst 240 that is above a corresponding predetermined fault threshold.

Figure 3:
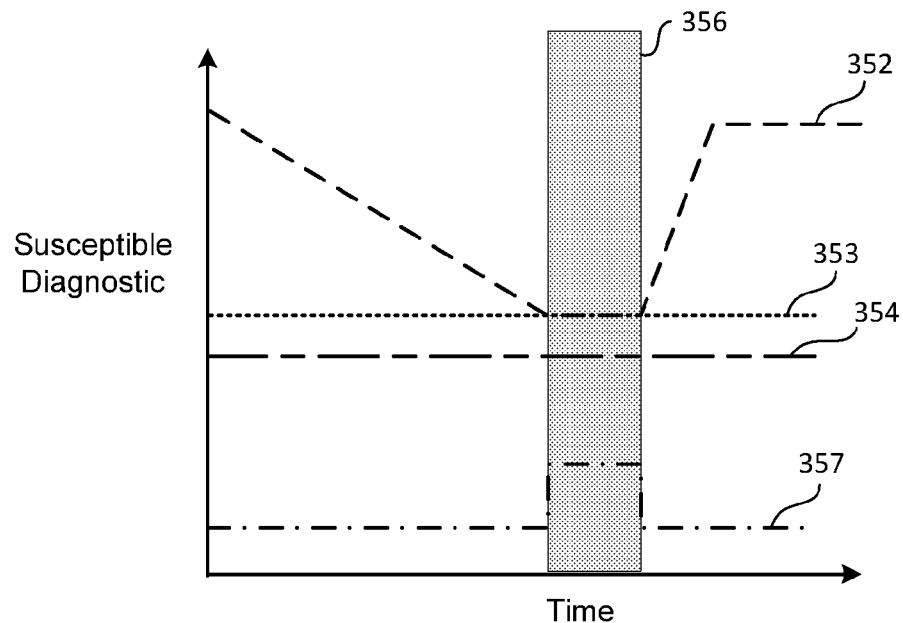
FIG. 3 is a graph showing diagnostic and regeneration values over a period of time where DEF deposits are causing a decline in the diagnostic signal value according to one embodiment of the invention.

The fault mitigation module 320 monitors diagnostics susceptible to DEF deposit formation within the DEF decomposition tube 239 and issues a decomposition tube regeneration request 325 to regenerate the tube when the monitored susceptible diagnostics reach or exceed a predetermined regeneration threshold. The predetermined regeneration threshold is set such that the monitored susceptible diagnostics will reach the predetermined regeneration threshold before reaching the predetermined fault threshold. For example, as shown in FIG. 3, for susceptible diagnostic signal values 352 that tend to decrease over time, such as $NO_x$ conversion efficiency, the regeneration threshold 353 is set higher than the fault threshold 354 such that as a susceptible diagnostic signal value decreases over time, it will reach the regeneration threshold before the fault threshold. For susceptible diagnostic signal values that tend to increase over time, such as a DPF outlet high pressure signal, the regeneration threshold would be set lower than the fault threshold.

Referring again to FIGS. 2 and 3, the fault mitigation module 320 monitors the drop in the susceptible diagnostic signal value. If the susceptible diagnostic signal value 352 reaches the regeneration threshold 353, the fault mitigation module 320 presumes a DEF deposit build-up in the DEF decomposition tube may be the cause of the diagnostic signal drop and issues the decomposition tube regeneration request 325.

The decomposition tube regeneration request 325 is initially forwarded to the diagnostic interrupt module 330, which issues a diagnostic interrupt command 335 in response to the request. The diagnostic interrupt command 335 is forwarded to the diagnostic fault module 310, which suspends diagnostic monitoring of susceptible diagnostics (e.g., all known susceptible diagnostics). As shown in FIG. 3, the suspension of diagnostic monitoring (e.g., diagnostic monitoring suspension time period 356) is scheduled to coincide with the regeneration of the DEF decomposition tube 239. The time period during which regeneration of the DEF decomposition tube 239 is regenerated is indicated in FIG. 3 by a step increase of a decomposition tube regeneration signal 357. Suspending the diagnostic monitoring of the susceptible diagnostics prevents the issuance of a diagnostic fault command 370 associated with the monitored susceptible diagnostics while the DEF decomposition tube 239 is being regenerated. After regeneration of the DEF decomposition tube 239 is completed, the diagnostic fault module 310 can resume the diagnostic monitoring of the susceptible diagnostics.

The diagnostic interrupt module 330 forwards the decomposition tube regeneration request 325 to the decomposition tube regeneration module 340. In response to the request 325, the decomposition tube regeneration module 340 issues a decomposition regeneration command 375, which is communicated to the control systems of the engine system 10, as well as the exhaust aftertreatment system 200. The control systems respond according to the operating parameters set in the regeneration command 375 to initiate the commanded regeneration event within the DEF decomposition tube 239. Generally, characteristics of regeneration events are governed by the temperature of the exhaust gas (e.g., at an inlet of the DEF decomposition tube and/or outlet of an upstream oxidation catalyst).

The decomposition tube regeneration module 340 sets the operating parameters to achieve a desirable regeneration objective, which can include removal of all or a desired portion of DEF deposits within the decomposition tube 239. In certain embodiments, the operating parameters governing the regeneration event include timing, duration, and intensity. The desired exhaust gas temperature targets (e.g., engine out temperature target and/or oxidation catalyst outlet temperature target) for initiating the regeneration event, ending the regeneration event, and sustaining the regeneration event (e.g., timing, duration, and intensity) can be obtained by modulating the operating conditions of the engine system as is known in the art. Generally, the variable operating conditions or factors can include engine out $NO_x$ concentration, hydrocarbon injection rate, exhaust gas mass flow rate, DEF injection rate, and SCR inlet $NH_3/NO_x$ ratio.

The regeneration event on the DEF decomposition tube 239 is designed to remove DEF deposits formed within the decomposition tube, as well as the DEF injector introduction tube, before they cause diagnostic faults. As shown in FIG. 3, if DEF deposits are indeed causing the susceptible diagnostic signal value to trend toward the fault threshold, then the susceptible diagnostic signal value 352 should trend away from the fault threshold (i.e., improve) after regeneration of the DEF decomposition tube 239 is complete and the objective of the regeneration event was effectively achieved.

Figure 4:
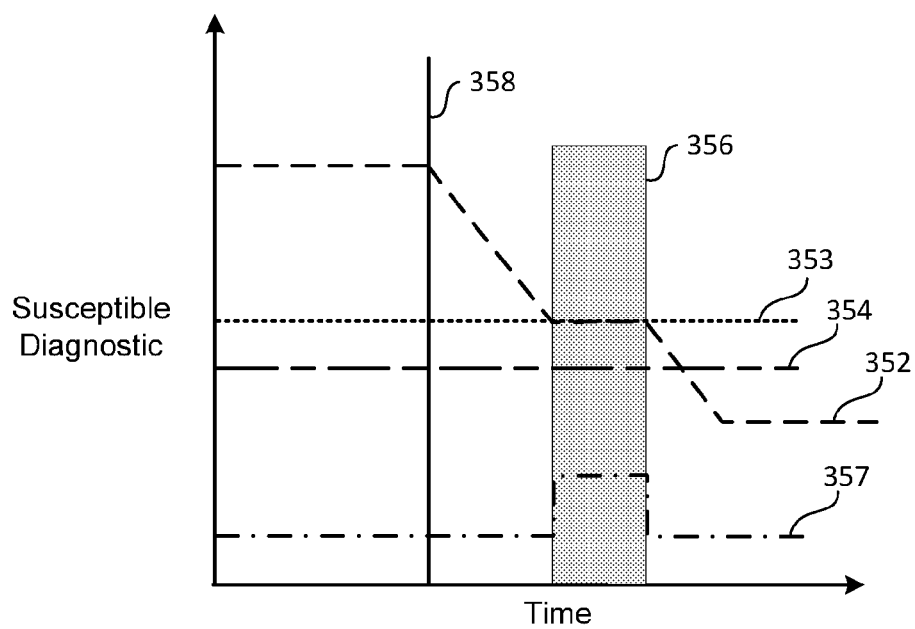
FIG. 4 is a graph showing diagnostic and regeneration values over a period of time where DEF deposits are not a substantial cause of a decline in the diagnostic signal value according to one embodiment of the invention.

However, as shown in FIG. 4, if the DEF deposits are not causing the susceptible diagnostic signal 352 to trend toward the fault threshold 354 (but a failure or malfunction of components directly related to $NO_x$ conversion efficiency is), then the susceptible diagnostic signal will continue to trend towards and ultimately reach the fault threshold, which will trigger a diagnostic fault and the issuance of an associated OBD command 370. For example, the graph of FIG. 4 represents a situation where a DEF tank or source 233 has been inadvertently refilled with water instead of DEF at time 358. The water will be injected into the decomposition tube 239 as if it were DEF. However, water does not decompose into $NH_3$. Accordingly, the SCR catalyst 234 will become starved of $NH_3$ and the susceptible diagnostic signal 352 (e.g., the $NO_x$ conversion efficiency of the SCR catalyst) will decline nearly immediately. Because the drop in $NO_x$ conversion efficiency is being caused at least partially by a condition other than the formation of DEF deposits in the DEF decomposition tube 239, the $NO_x$ conversion efficiency will continue to drop after regenerating the decomposition tube (e.g., after the step increase of the regeneration signal 357) and the associated diagnostic fault will be set once it reaches the fault threshold 354.

In some embodiments, the fault mitigation module 320 may include a regeneration frequency module 395 configured to regulate the frequency of regeneration events on the DEF decomposition tube 239. Regeneration events on the DEF decomposition tube 239 may result in a temporary reduction of the emissions reducing capacity of the exhaust aftertreatment system 200, as well as temporary periods where the diagnostic monitoring of susceptible diagnostics is not taking place. To limit these potentially negative side effects, the frequency of regeneration events on the decomposition tube 239 should be limited.

The regeneration frequency module tracks the period of time between the completion of a previous regeneration event on the DEF decomposition tube 239 and a request for a subsequent regeneration event on the tube. If the period of time is less than a predetermined minimum time requirement, the regeneration frequency module delays the initiation of the subsequent regeneration event until a period of time equal to or more than the minimum time requirement has passed since the previous regeneration event. In this manner, the regeneration frequency module 395 limits the frequency of regeneration events to a level that balances the need of preventing diagnostic faults with the need to ensure emissions compliance and continuous OBD diagnostic monitoring of susceptible diagnostics.

In certain embodiments, the regeneration frequency module tracks the period of time between the completion of a previous regeneration event of any type and a request for a subsequent regeneration event on the DEF decomposition tube 239. In certain applications, a regeneration event on the DEF decomposition tube 239 may occur at the same time as a regeneration event on the DPF 220. Accordingly, the minimum time requirement can be associated with a minimum time between the end of either a DPF or DEF decomposition tube regeneration event and when a future regeneration of a DEF decomposition tube is permitted.

Referring back to FIG. 2, in certain embodiments, the controller 300 includes a system override module 380. In certain instances, the initiation of a commanded regeneration of the DEF decomposition tube 375 as discussed above may be inhibited by the actions of a user or operator. In such instances, to prevent DEF deposits from growing too large for easy decomposition, the system override module 380 may light the DPF lamp to alert the user of the need for an active regeneration of the DEF decomposition tube 375. The alert can be communicated via a DPF lamp on the dashboard, as opposed to an OBD lamp, such as an MIL. In response to the alert, the user should change whatever action is preventing the initiation of the regeneration event. Operator actions that may prohibit a regeneration event on the DEF decomposition tube 375 can include a regeneration inhibit or disable switch in the ON position, tough duty cycles (e.g., frequent stops and starts) where an aftertreatment system cannot attain the requisite regeneration temperatures.

If the user fails to remove the impediment prohibiting the regeneration event within a reasonable period of time, the system override module 380 is configured to initiate measures designed to mitigate the consequences of the operator's inaction. For example, in one implementation, the system override module 380 overrides the diagnostic interrupt command 335 to re-enable the diagnostic monitoring of the susceptible diagnostic causing the decomposition tube regeneration request 325. In another implementation, the system override module 380 activates immediate or delayed torque derating, i.e., controllably limiting the torque output of the engine relative to its normal torque output for the current engine operating conditions. In certain implementations, a reasonable period of time before initiating the measures may be determined from an estimate of the DEF deposit deposition rate obtained from experimentation. Generally, torque derate should start before the deposits grow too big (e.g., grow out of regeneration decomposable sizes). Additionally, in certain implementations, there may be legislated requirements on inducement time for tampering faults.

During an active regeneration of the decomposition tube 239, the system override module 380 also may be configured to override the DEF injection rate commanded by the SCR system 230. Even though active regeneration of the decomposition tube 239 may be occurring, the SCR system 230 must continue to inject DEF into the decomposition tube 239 and reduce $NO_x$ to comply with emissions standards. Injected DEF tends to cool the exhaust gas passing through the decomposition tube, as well as the DEF deposits, and thus may hinder the decomposition of DEF deposits during a regeneration event. In certain instances, high DEF injection rates may significantly cool the exhaust gas such that decomposition of DEF deposits is altogether prevented. However, DEF injections cannot be suspended during active decomposition tube regeneration due to emissions constraints and because most DEF injectors require some minimum DEF injection rate to cool the DEF injectors.

Accordingly, during active decomposition tube regeneration, the system override module 380 limits the DEF injection rate to ensure that the regeneration objective is achievable within a reasonable period of time and that emissions and other requirements are not compromised. The system override module 380 limits the DEF injection rate based on a minimum DEF injection rate requirement for DEF injector tip cooling, a maximum DEF injection rate for DEF decomposition, and a minimum desired SCR inlet ammonia-to-$NO_x$ ratio (ANR) for emissions reduction. The maximum DEF injection rate is a function of exhaust gas mass flow rate. For example, at high exhaust gas mass flow rates, the cooling effect of injected DEF on deposit decomposition is less significant. The minimum desired SCR inlet ANR is predetermined or calculated to meet or exceed the minimum exhaust emissions reduction requirements. Accordingly, the minimum DEF injection rate during active decomposition tube regeneration should be sufficient enough to satisfy the minimum desired SCR inlet ANR. Generally, DEF injection rate is proportional to ANR.

Based on the above, during active decomposition tube regeneration, the system override module 380 determines a limited or reduced DEF injection rate based on a maximum DEF injection rate for DEF decomposition, a minimum DEF injection rate for injector tip cooling, a DEF injection rate corresponding to a minimum ANR, and the actual DEF injection rate that the SCR control system would command under normal circumstances (i.e., during inactive decomposition tube regeneration). The limited DEF injection rate (i.e., the DEF injection rate to be injected during active decomposition tube regeneration) is the lesser of: (1) the greater of the maximum DEF injection rate for DEF decomposition, the minimum DEF injection rate for injector tip cooling, and the DEF injection rate corresponding to a minimum ANR; and (2) the actual DEF injection rate that the SCR control system would command under normal circumstances (e.g., is presently commanding). The system override module 380 then issues a limited or modified DEF rate command 390 based on the limited DEF injection rate calculated above. In this manner, the system override module 380 prevents the injection of more DEF during an active regeneration event than the system would have otherwise required.

Figure 5:
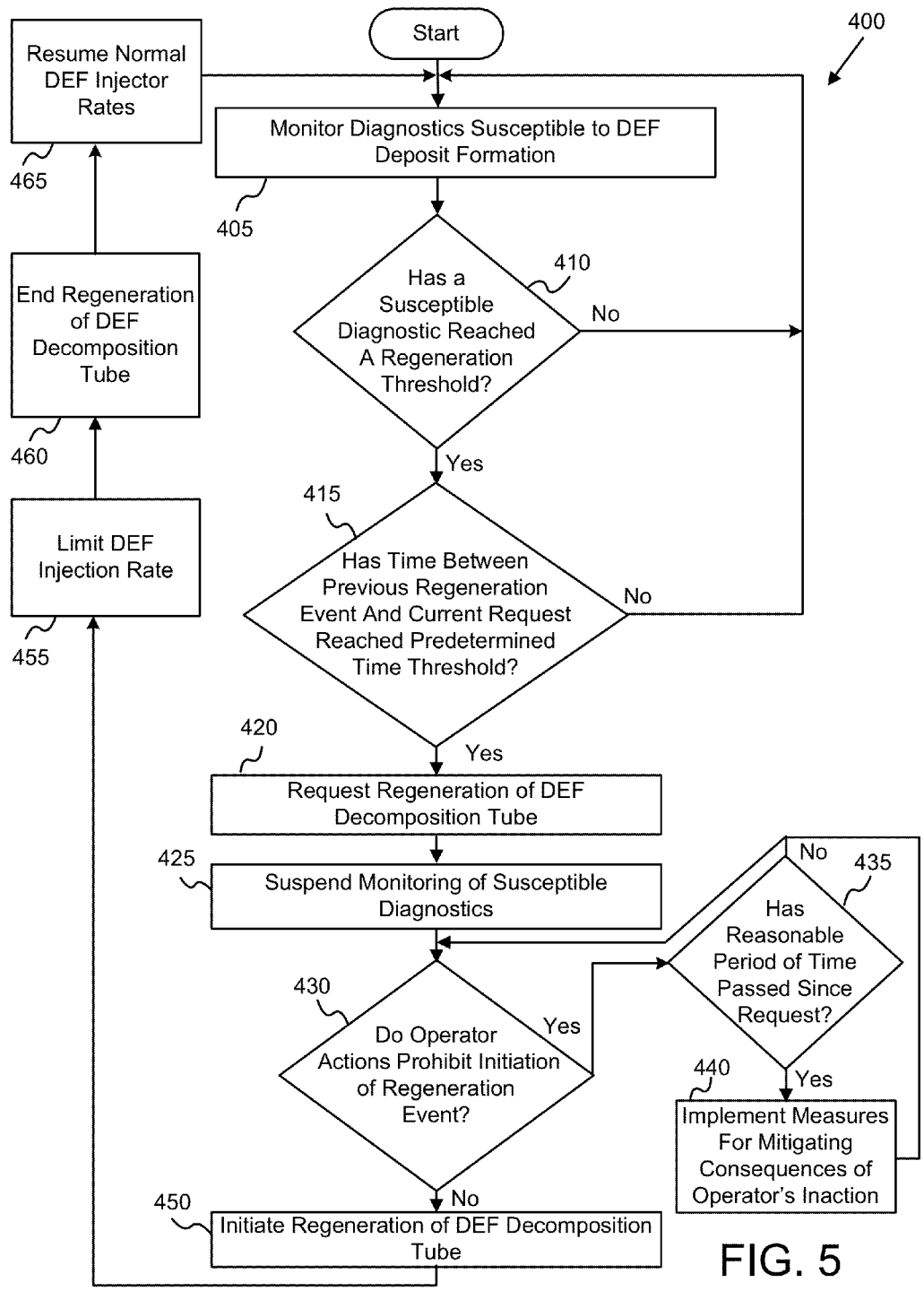
FIG. 5 is a flow chart diagram of a method for mitigating diagnostic faults in an engine system according to one embodiment.

Referring to FIG. 5, a method 400 for mitigating diagnostic faults of diagnostics susceptible to DEF deposits includes monitoring diagnostics susceptible to DEF deposit formation at 405. Susceptible diagnostics can be any of various diagnostic signals that may be sensitive to DEF deposit changes. For example, in one implementation, the susceptible diagnostics include a SCR $NO_x$ conversion efficiency diagnostic (based partially on SCR inlet and outlet $NO_x$ sensor signals) and DPF outlet high pressure diagnostic (based partially on DPF filter outlet pressure sensor signals).

The method 400 determines whether at least one of the susceptible diagnostics has reached a corresponding regeneration threshold at 410. The regeneration threshold is predetermined to be reached before the susceptible diagnostic reaches a fault threshold. If a susceptible diagnostic has not reached its corresponding regeneration threshold, then the method 400 returns to action 405 and continues to monitor the susceptible diagnostics. However, if a susceptible diagnostic has reached its corresponding regeneration threshold, then the method 400 proceeds to determine whether the period of time between a previous regeneration event on the DEF decomposition tube (or DPF) and the current request for regeneration has reached a predetermined time threshold at 415. If the time threshold has not been reached, then the method 400 returns to action 405. However, if the time threshold has been reached, then the method 400 proceeds to request regeneration of the DEF decomposition tube in which DEF deposits may be present at 420. At 425, the method 400 then suspends monitoring of the susceptible diagnostic that reached the regeneration threshold as determined at 410, and, in some implementations, all other susceptible diagnostics.

After suspending the monitoring of the susceptible diagnostic at 425, the method 400 proceeds to determine whether an operator's actions prohibit the initiation of the requested regeneration event at 430. If so, the operator can be alerted of the situation via a DPF lamp on a dashboard and given an opportunity to cease the prohibiting action or actions. The method 400 then determines if a reasonable period of time has passed since the regeneration request at 435. If a reasonable period of time has not passed, then the method 400 repeats action 430. However, if a reasonable period of time has passed, then the method 400 implements measures for mitigating the consequences of the operator's inaction at 440 if the operator has not yet ceased the prohibiting action. The measures can include re-enabling the suspended monitoring of the susceptible diagnostics, implement an engine torque derate procedure, and/or other desirable measures. After the measures are implemented at 440, the method 400 returns to action 430.

If at 430, the operator's actions do not prohibit the initiation of the requested event, either because such prohibiting operator's actions were not originally present or the operator ceased such actions, the method 400 proceeds to initiate the regeneration of the DEF decomposition tube according to the parameters of the request at 450. In certain implementations, after or concurrently with initiating the regeneration of the DEF decomposition tube, the method 400 limits the DEF injection rate at 455.

The method 400 also includes ending the initiated regeneration event on the DEF decomposition tube at 460 and resuming normal DEF injection rates at 465. In certain implementations, an initiated regeneration event on the DEF decomposition tube ends after a predetermined period of time. More specifically, in certain implementations, the regeneration event ends when a timer reaches the predetermined period of time where the timer increments only when exhaust gas temperatures are within a predetermined range of a regeneration target temperature.

The subject matter of the present disclosure may be embodied in other specific forms without departing from its spirit or essential characteristics. The described embodiments are to be considered in all respects only as illustrative and not restrictive. The scope of the subject matter is, therefore, indicated by the appended claims rather than by the foregoing description. All changes which come within the meaning and range of equivalency of the claims are to be embraced within their scope.

What is claimed is:

1. An apparatus for mitigating on-board diagnostic (OBD) faults generated by an OBD system of an internal combustion engine (ICE) system having a selective catalytic reduction system with a diesel exhaust fluid (DEF) decomposition tube, the apparatus comprising an electronic controller with instructions that when executed:
   monitors at least one OBD signal of the OBD system and issues a request for regenerating the DEF decomposition tube when a value of the at least one OBD signal reaches a predetermined regeneration threshold corresponding with the at least one OBD signal, the regeneration threshold being reachable prior to an OBD fault threshold corresponding with the at least one OBD signal; and
   regenerates the DEF decomposition tube according to the issued request.

2. The apparatus of claim 1, wherein the electronic controller further includes instructions that when executed alerts a user of user actions preventing the initiation of a requested regeneration event and implements measures for mitigating consequences of the user actions if the user does not cease the user actions within a predetermined time period.

3. The apparatus of claim 2, wherein the electronic controller further includes instructions that when executed suspends monitoring of the at least one OBD signal in response to the issuance of a request for regenerating the DEF decomposition tube, wherein the measures for mitigating consequences of the user actions comprise overriding the suspension of the monitoring of the at least one OBD signal to re-enable the monitoring of the at least one OBD signal.

4. The apparatus of claim 2, wherein the measures for mitigating consequences of the user actions comprise torque derating of the ICE system.

5. The apparatus of claim 2, wherein the predetermined time period is based on an estimate of the deposition rate of DEF deposits within the DEF decomposition tube.

6. The apparatus of claim 1, wherein the electronic controller further includes instructions that when executed monitors the period of time between a previous exhaust aftertreatment system regeneration event and the request for regenerating the DEF decomposition tube, and delays an initiation of the requested regeneration of the DEF decomposition tube if the period of time is less than a time threshold.

7. The apparatus of claim 1, wherein the electronic controller further includes instructions that when executed suspends monitoring of the at least one OBD signal in response to the issuance of a request for regenerating the DEF decomposition tube.

8. The apparatus of claim 7, wherein the electronic controller further includes instructions that when executed resumes monitoring of the at least one OBD signal after regeneration of the DEF decomposition tube is complete.

9. The apparatus of claim 1, wherein the electronic controller further includes instructions that when executed limits a normal injection rate of DEF into the DEF decomposition tube during active DEF decomposition tube regeneration.

10. The apparatus of claim 9, wherein the electronic controller further includes instructions that when executed limits the normal injection rate of DEF by a determined amount based on a maximum DEF injection rate for DEF decomposition, a minimum DEF injection rate for cooling a DEF injector tip, a DEF injection rate corresponding to a minimum desired ammonia-to-NOx ratio at an inlet of a selective catalytic reduction catalyst of the selective catalytic reduction system, and the normal injection rate of DEF.

11. The apparatus of claim 10, wherein the limited injection rate of DEF is the lesser of: (1) the greater of the maximum DEF injection rate for DEF decomposition, the minimum DEF injection rate for cooling a DEF injector tip, and the DEF injection rate corresponding to the minimum desired ammonia-to-NOx ratio; and (2) the normal injection rate of DEF.

12. The apparatus of claim 1, wherein the at least one OBD signal comprises at least one of a first OBD signal corresponding with a $NO_x$ conversion efficiency of the selective catalytic reduction system and a second OBD signal corresponding with a particulate matter filter outlet high pressure.

13. A system for mitigating on-board diagnostic (OBD) faults generated by an OBD system of an internal combustion engine (ICE) system and caused by solid diesel exhaust fluid (DEF) deposits, comprising:
   a selective catalytic reduction (SCR) system comprising a DEF injector and DEF decomposition tube, the DEF injector configured to inject DEF into the DEF decomposition tube; and
   an electronic controller with instructions that when executed:
      monitors a plurality of OBD signals of the OBD system and sets a diagnostic fault when a monitored OBD signal reaches a fault threshold corresponding with the monitored OBD signal;
      monitors at least one OBD signal of the plurality of OBD signals that is susceptible to solid DEF deposits within the decomposition tube; and
      requests regeneration of the DEF decomposition tube when the at least one monitored OBD signal susceptible to solid DEF deposits within the decomposition tube reaches a corresponding regeneration threshold, wherein the regeneration threshold is set to be reached before the fault threshold corresponding with the at least one monitored susceptible OBD signal.

14. The system of claim 13, wherein the at least one susceptible OBD signal comprises a $NO_x$ conversion efficiency OBD signal.

15. The system of claim 13, wherein the system comprises a particulate matter filter in exhaust providing communication with the SCR system, and wherein the at least one susceptible OBD signal comprises a particulate matter filter outlet high pressure OBD signal based at least partially on input from a particulate matter filter outlet exhaust pressure sensor.

16. The system of claim 13, wherein the electronic controller further includes instructions that when executed limits the rate at which DEF is injected into the DEF decomposition tube by the DEF injector during an active regeneration of the DEF decomposition tube.

17. The system of claim 13, further comprising an oxidation catalyst upstream of the SCR system, wherein the DEF decomposition tube is positioned between an SCR catalyst of the SCR system and the oxidation catalyst, and wherein control of the regeneration of the DEF decomposition tube is based on an oxidation catalyst outlet temperature.

18. A method for mitigating on-board diagnostic (OBD) faults in an internal combustion engine (ICE) system having a selective catalytic reduction system with a diesel exhaust fluid (DEF) decomposition tube, the method comprising:
monitoring a plurality of OBD signals;
setting a diagnostic fault when one of the plurality of OBD signal reaches a corresponding fault threshold;
monitoring at least one OBD signal of the plurality of OBD signals that is susceptible to solid DEF deposits within the decomposition tube;
requesting regeneration of the DEF decomposition tube when the at least one OBD signal susceptible to solid DEF deposits within the decomposition tube reaches a corresponding regeneration threshold, the regeneration threshold being reachable before the fault threshold corresponding with the at least one susceptible OBD signal;
regenerating the DEF decomposition tube according to the regeneration request; and
suspending monitoring of the at least one susceptible OBD signal during regeneration of the DEF decomposition tube.

19. The method of claim 18, wherein the at least one susceptible OBD signal comprises a $NO_x$ conversion efficiency OBD signal associated with the selective catalytic reduction system, and wherein the regeneration threshold of the $NO_x$ conversion efficiency OBD signal is higher than the fault threshold of the $NO_x$ conversion efficiency OBD signal.

20. The method of claim 18, wherein the ICE system comprises a particulate matter filter, wherein the at least one susceptible OBD signal comprises a particulate matter filter outlet high pressure OBD signal, and wherein the regeneration threshold of the particulate matter filter outlet high pressure OBD signal is lower than the fault threshold of the particulate matter filter outlet high pressure OBD signal.

* * * * *